United States Patent
Ohno

(10) Patent No.: US 11,961,328 B2
(45) Date of Patent: Apr. 16, 2024

(54) EYE DETECTING METHOD, EYE DETECTING DEVICE, AND NON-TRANSITORY COMPUTER-READABLE RECORDING MEDIUM RECORDING EYE DETECTING PROGRAM

(71) Applicants: Swallow Incubate Co., Ltd., Ibaraki (JP); Panasonic Holdings Corporation, Osaka (JP)

(72) Inventor: Toshikazu Ohno, Ibaraki (JP)

(73) Assignees: SWALLOW INCUBATE CO., LTD., Ibaraki (JP); PANASONIC HOLDINGS CORPORATION, Osaka (JP)

(*) Notice: Subject to any disclaimer, the term of this patent is extended or adjusted under 35 U.S.C. 154(b) by 66 days.

(21) Appl. No.: 17/828,440

(22) Filed: May 31, 2022

(65) Prior Publication Data

US 2022/0292881 A1 Sep. 15, 2022

Related U.S. Application Data

(63) Continuation of application No. PCT/JP2021/021988, filed on Jun. 9, 2021.

(30) Foreign Application Priority Data

Dec. 22, 2020 (JP) ................. 2020-212908

(51) Int. Cl.
*G06V 40/18* (2022.01)
*G06V 10/46* (2022.01)
*G06V 10/60* (2022.01)

(52) U.S. Cl.
CPC ............ *G06V 40/193* (2022.01); *G06V 10/46* (2022.01); *G06V 10/60* (2022.01)

(58) Field of Classification Search
CPC ...... G06V 40/193; G06V 10/60; G06V 10/46; G06V 40/18; G06V 40/168; G06V 40/171;
(Continued)

(56) References Cited

U.S. PATENT DOCUMENTS

| | | | |
|---|---|---|---|
| 2007/0154096 A1* | 7/2007 | Cao | G06V 40/171 382/190 |
| 2011/0182509 A1* | 7/2011 | Free | G06V 40/162 382/165 |

(Continued)

FOREIGN PATENT DOCUMENTS

| | | |
|---|---|---|
| JP | 2001-340300 | 12/2001 |
| JP | 3337913 | 10/2002 |

(Continued)

OTHER PUBLICATIONS

Palghamol, Tanuj N., and Shilpa P. Metkar. "Flexible luminance thresholding for detecting eyes in color images." Proceedings of The 2014 International Conference on Control, Instrumentation, Energy and Communication (CIEC). IEEE, 2014 (Year: 2014).*

(Continued)

*Primary Examiner* — Edward F Urban
*Assistant Examiner* — Duy Tran
(74) *Attorney, Agent, or Firm* — WENDEROTH, LIND & PONACK, L.L.P.

(57) ABSTRACT

An eye detecting device is configured to: acquire a color image including a face of a person taken by an image taking device; generate a grayscale image by multiplying each of a red component value, a green component value, and a blue component value of each pixel of the color image by a predetermined ratio according to characteristics of a lens of (Continued)

glasses that the person wears; detect an eye of the person from the grayscale image; and output eye information on the eye of the person.

9 Claims, 17 Drawing Sheets

(58) Field of Classification Search
CPC ...... G06V 40/40; G06V 40/16; G06V 40/165; G06V 10/50; G06V 10/56; G06V 10/52; G06V 10/751; G06V 10/469
See application file for complete search history.

(56) References Cited

U.S. PATENT DOCUMENTS

| | | | | |
|---|---|---|---|---|
| 2011/0249863 | A1* | 10/2011 | Ohashi | G06V 40/175 |
| | | | | 382/103 |
| 2012/0170027 | A1* | 7/2012 | Tsukizawa | G06T 7/00 |
| | | | | 356/124 |
| 2013/0236091 | A1* | 9/2013 | Ubillos | G06F 3/04845 |
| | | | | 382/163 |
| 2015/0310253 | A1* | 10/2015 | Agrawal | H04N 23/11 |
| | | | | 382/103 |
| 2021/0174118 | A1* | 6/2021 | Chhabra | G06V 20/635 |
| 2022/0036046 | A1 | 2/2022 | Yachida | |

FOREIGN PATENT DOCUMENTS

| | | | |
|---|---|---|---|
| JP | 2015-194884 | 11/2015 | |
| JP | 2019-101974 | 6/2019 | |
| WO | WO-2017036160 A1 * | 3/2017 | ............ G06K 9/00 |
| WO | 2020/129138 | 6/2020 | |

OTHER PUBLICATIONS

International Search Report dated Jul. 27, 2021 in International (PCT) Application No. PCT/JP2021/021988.

* cited by examiner

US 11,961,328 B2

EYE DETECTING METHOD, EYE DETECTING DEVICE, AND NON-TRANSITORY COMPUTER-READABLE RECORDING MEDIUM RECORDING EYE DETECTING PROGRAM

TECHNICAL FIELD

The present disclosure relates to a technique for detecting an eye of a person from an image.

BACKGROUND ART

The eye detection technique of detecting an eye of a person from an image is an essential technology necessary for detection of a sightline, personal identification, and the like.

In the eye detection technique, when an image of a person wearing glasses is taken, there is a likelihood that a lens of the glasses reflects light having a specific wavelength or reflects external light or a background, causing noise to be included in an area of the eye in the image, and consequently lowering the accuracy in detection of an eye from the image. Thus, it is necessary to prevent the lens of the glasses from reflecting external light or a background.

For example, in an image taking method of Patent Literature 1, an image of an eyeball is taken by irradiating a light ray to the eyeball of a person at one incident angle to obtain an iris pattern by reflected light. Whether the taken image of the eyeball is acceptable or not is determined on the basis of a predetermined threshold. If it is determined that the image is not acceptable, another image of the eyeball is taken by irradiating a light ray at another incident angle which is different from the one incident angle.

In an image taking method of Patent Literature 2, a degree of opening of an eye is detected using a near-infrared light ray oscillating in a direction of a predetermined polarization axis, without an influence of reflected light from the glasses.

However, in the conventional techniques described above, it is difficult to improve the accuracy in the detection of an eye of a person from a color image. Thus, it has been required that the eye detection technique be further improved.

CITATION LIST

Patent Literature

Patent Literature 1: Japanese Patent No. 3337913
Patent Literature 2: Japanese Unexamined Patent Application Publication No. 2015-194884

SUMMARY OF INVENTION

The present disclosure has been made to solve the above-mentioned problem, and the object thereof is to provide a technique for improving the accuracy in the detection of an eye of a person from a color image.

In an eye detecting method according to an aspect of the present disclosure, a computer acquires a color image including a face of a person taken by an image taking device; generates a grayscale image by multiplying each of a red component value, a green component value, and a blue component value of each pixel of the color image by a predetermined ratio according to characteristics of a lens of glasses that the person wears; detects an eye of the person from the grayscale image; and outputs eye information on the detected eye.

The present disclosure enables improvement of the accuracy in the detection of an eye of a person from a color image.

Figure 1:
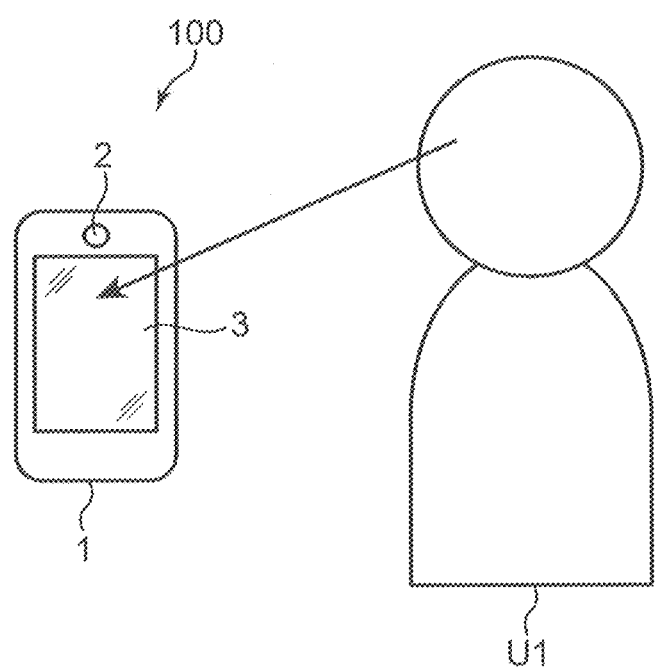
FIG. 1 is a diagram of an eye detecting system according to an embodiment 1 of the present disclosure.

DESCRIPTION OF EMBODIMENTS (Underlying Findings for Present Disclosure)
Patent Literature 1 requires a lighting device which is able to change the incident angle of irradiation light rays to an eyeball. Patent Literature 2 requires a lighting device which irradiates near-infrared light rays oscillating in a direction of a predetermined polarization axis.

Each of the above-mentioned conventional techniques requires a special lighting device for suppressing reflection of external light or a background in a lens of glasses. Thus, in a device such as a smartphone or a tablet which does not include a lighting device or includes a simple lighting device only, it is difficult to improve the accuracy in the detection of an eye of a person from an image.

To solve the above-mentioned problem, an eye detecting method according to an aspect of the present disclosure includes: by a computer, acquiring a color image including a face of a person taken by an image taking device; generating a grayscale image by multiplying each of a red component value, a green component value, and a blue component value of each pixel of the color image by a predetermined ratio according to characteristics of a lens of glasses that the person wears; detecting an eye of the person from the grayscale image; and outputting eye information on the detected eye.

In this configuration, a grayscale image is generated by multiplying each of a red component value, a green component value, and a blue component value of each pixel of the color image by a predetermined ratio according to characteristics of a lens of glasses that the person wears; and an eye of the person is detected from the grayscale image. Thus, even in a device such as a smartphone or a tablet which has a simple configuration, the accuracy in the detection of the eye of the person from the color image can be improved by removing external light or a background reflected in a lens part of the glasses included in the color image.

Further, in the eye detecting method described above, the ratio by which the red component value is multiplied may be higher than the respective ratios by which the green component value and the blue component value are multiplied.

In this configuration, a grayscale image which has the red component more than the green component and the blue component is generated. Thus, light having the green component and light having the blue component reflected from the lens part of the glasses can be reduced in the case that a lens of glasses that a person wears has a characteristic of reflecting light having the green component and the blue component.

In the eye detecting method described above, the ratio by which the blue component value is multiplied may be 0.

In this configuration, a grayscale image without the blue component is generated. Thus, the light that has the blue component and is reflected from the lens part of the glasses can be removed in the case that a lens of glasses that a person wears has a characteristic of reflecting light having the blue component.

The eye detecting method described above may further include: calculating an average luminance value of an eye region including the detected eye; determining whether the calculated average luminance value is higher than a threshold; and outputting reflection information indicating that the lens of the glasses reflects external light or a background, when it is determined that the calculated average luminance value is higher than the threshold.

The eye region is brighter in the case that the lens part of the glasses reflects external light or a background than in the case that the lens part of the glasses does not reflect external light or a background. Thus, the comparison between the average luminance value in the eye region and the threshold enables detection of a remaining portion of the external light or background reflected in the lens part of the glasses that has not yet been removed in the generation of the grayscale image.

The eye detecting method described above may further include: generating a binary image from the color image; extracting from the binary image an estimated glasses region where the glasses are estimated to be present; determining whether the person wears the glasses, on the basis of a length in a horizontal direction of a white region where a plurality of white pixels continue in the extracted estimated glasses region; and detecting an eye of the person from the color image when it is determined that the person does not wear the glasses, wherein: generating the grayscale image in the generation of the grayscale image when it is determined that the person wears the glasses.

In this configuration, an eye of the person is detected from the color image without generation of a grayscale image when it is determined that the person does not wear the glasses. On the other hand, a grayscale image is generated in order to remove the external light or background reflected in the lens part of the glasses included in the color image when it is determined that the person wears glasses. Accordingly, only when the person wears the glasses, a process of removing external light or a background reflected in the lens part of the glasses included in the color image is executed.

The eye detecting method described above may further include: detecting a face region including a face of the person from the color image; calculating an average luminance value of the face region; determining that the eye is detectable, when the calculated average luminance value is higher than a threshold; and determining that the eye is undetectable, when the calculated average luminance value is not higher than the threshold.

When a person is in a dark place, the lens part of the glasses is more likely to reflect external light. In other words, in the eye detecting process using a color image, the brightness in the place where the image is taken affects occurrence of reflection in the lens of the glasses. Therefore, it is determined that the eye is detectable when the average luminance value of the face region is higher than a threshold; and it is determined that the eye is undetectable when the average luminance value of the face region is not higher than the threshold. This configuration enables to execute the process of removing the external light or background reflected in the lens part of the glasses included in the color image only when the eye is detectable.

The eye detecting method described above may further include: notifying the person that the eye is undetectable, when it is determined that the eye is undetectable.

In this configuration, the person is notified that the eye is undetectable, when it is determined that the eye is undetectable. Thus, the notified person moves to a brighter place, thereby enabling the eye detection.

The eye detecting method described above may further include: generating a first image in which a pixel having a gradation value smaller than a threshold is represented at a first luminance value and a pixel having a gradation value not smaller than the threshold is represented at a second luminance value, after the grayscale image is binarized; generating a second image by replacing a pixel which has the second luminance value in a first luminance region having the first luminance value in the first image and satisfies a predetermined condition with a pixel having the first luminance value; calculating iris information including information indicative of at least one of a position and a size of an iris of the person using the second image; and outputting the iris information.

In this configuration, a second image is generated by replacing a pixel which has the second luminance value in a first luminance region in the first image and satisfies a predetermined condition with a pixel having the first luminance value. Thus, an island region which has the second luminance value and appears in a region corresponding to a colored part of the eye in the first luminance region is changed over to the first luminance value. Subsequently, the iris information is calculated using the second image which is the changed over binary image. Thus, the influence of external light or a background on the cornea is suppressed, enabling further improvement of the accuracy in detection of the iris information.

The present disclosure can be realized not only as an eye detecting method in which the distinctive processings as described above are executed, but also as an eye detecting device including distinctive configurations corresponding to the distinctive procedures executed in the eye detecting method. The present disclosure also can be realized as a computer program causing a computer to execute the distinctive processings included in the eye detecting method. Accordingly, other aspects described below also can exert similar advantageous effects to the eye detecting method described above.

An eye detecting device according to another aspect of the present disclosure includes: an acquiring part for acquiring a color image including a face of a person taken by an image taking device; a generating part for generating a grayscale image by multiplying each of a red component value, a green component value, and a blue component value of each pixel of the color image by a predetermined ratio according to characteristics of a lens of glasses that the person wears; a detecting part for detecting an eye of the person from the grayscale image; and an outputting part for outputting eye information on the detected eye.

A non-transitory computer-readable recording medium recording an eye detecting program according to another aspect of the present disclosure causes a computer to execute processings of: acquiring a color image including a face of a person taken by an image taking device; generating a grayscale image by multiplying each of a red component value, a green component value, and a blue component value of each pixel of the color image by a predetermined ratio according to characteristics of a lens of glasses that the person wears; detecting an eye of the person from the grayscale image; and outputting eye information on the detected eye.

Embodiments of the present disclosure will be described below with reference to the attached drawings. The following embodiments are merely examples realized from the present disclosure and the technical scope of the present disclosure is not limited thereto.

Embodiment 1

FIG. 1 is a diagram of an eye detecting system 100 according to an embodiment 1 of the present disclosure. The eye detecting system 100 is configured in a mobile terminal device such as a smartphone or a tablet. This configuration is merely an example, and the eye detecting system 100 may be configured in a desktop computer or a cloud serve by a proper combination with a camera and a display.

The eye detecting system 100 includes an eye detecting device 1, an image taking device 2, and a display 3. The eye detecting device 1 calculates eye information on an eye of a person U1 taken by the image taking device 2.

The image taking device 2 is constituted by a camera mounted on the mobile terminal device. The image taking device 2 is a camera capable of taking a color visible light image at a predetermined frame rate.

The display 3 is constituted by a displaying device such as a liquid-crystal display or an organic electro-luminescence (EL) display mounted on the mobile terminal device. The display 3 displays an image of a face of the person U1 taken by the image taking device 2. The display 3 further displays the below-described eye information calculated by the eye detecting device 1 and superimposed on the image of the face of the person U1.

Figure 2:
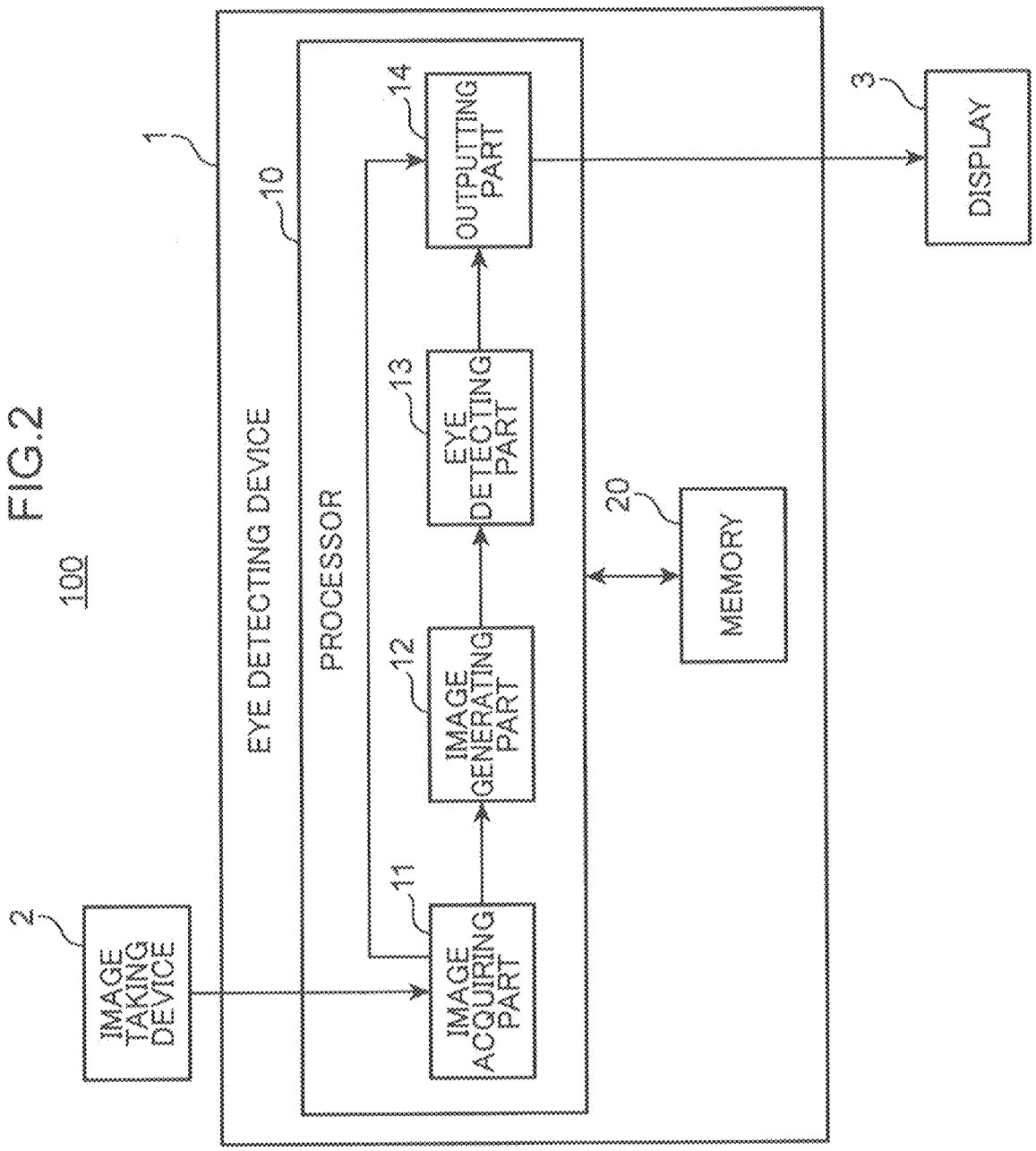
FIG. 2 is a block diagram showing an exemplary whole structure of the eye detecting system according to the embodiment 1 of the present disclosure.

FIG. 2 is a block diagram showing an exemplary whole structure of the eye detecting system 100 according to the embodiment 1 of the present disclosure. The eye detecting device 1 includes a processor 10 and a memory 20. The processor 10 includes, for example, a central processing unit (CPU). The processor 10 includes an image acquiring part 11, an image generating part 12, an eye detecting part 13, and an outputting part 14. The image acquiring part 11, the image generating part 12, the eye detecting part 13, and the outputting part 14 do performance, for example, when the processor 10 executes the eye detecting program.

The image acquiring part 11 acquires a color image taken by the image taking device 2. The acquired color image includes the face of the person U1. Hereinafter, an image including a face is referred to as a face image. The image acquiring part 11 sequentially acquires Pace images taken at a predetermined frame rate.

The image generating part 12 converts the color image into a grayscale image. The image generating part 12 generates the grayscale image by multiplying each of a red component value, a green component value, and a blue component value of each pixel of the color image acquired by the image acquiring part 11 by a predetermined ratio according to characteristics of a lens of glasses that the person U1 wears. The image generating part 12 generates the grayscale image by multiplying each of a red component value, a green component value, and a blue component value of each pixel of the color image by a predetermined ratio according to characteristics of a lens of glasses that the person U1 wears, and summing the multiplied red component value, green component value, and blue component value.

In the generation of the grayscale image, the ratio by which the red component value is multiplied is higher than the respective ratios by which the green component value and the blue component value are multiplied. For example, the ratio by which the red component value is multiplied is 0.9, the ratio by which the green component value is multiplied is 0.1, and the ratio by which the blue component value is multiplied is 0. In this case, the image generating part 12 calculates a pixel value V of each pixel of the grayscale image in the following equation (1).

$$V = 0.9 \cdot R + 0.1 \cdot G + 0 \cdot B \tag{1}$$

In the equation (1) above, R represents a red component value of each pixel of the color image, G represents a green component value of each pixel of the color image, and B represents a blue component value of each pixel of the color image.

The respective ratios by which the red component value, the green component value, and the blue component value are multiplied may be, for example, 1.0, 0, and 0.

The ratio by which the red component value is multiplied is preferably higher than a normal ratio (e.g., 0.299) in a conversion of a color image into a grayscale image. The ratio by which the green component value is multiplied is preferably lower than a normal ratio (e.g., 0.587) in a conversion of a color image into a grayscale image. The ratio by which the blue component value is multiplied is preferably lower than a normal ratio (e.g., 0.114) in a conversion of a color image into a grayscale image.

The ratio by which the red component value is multiplied is preferably from 0.3 to 1.0, more preferably from 0.9 to 1.0. The ratio by which the green component value is multiplied is preferably from 0 to 0.58, more preferably from 0 to 0.1. The ratio by which the blue component value is multiplied is preferably 0.

A light emitting diode (LED) display of a personal computer or a smartphone emits blue light having a wavelength of 380 to 500 nm which is close to that of the ultraviolet. The blue light may have a bad effect on an eye of a person. Therefore, there are glasses capable of reducing the blue light. The glasses capable of reducing the blue light prevents the blue light from reaching the eye by reflecting the blue light by the lens thereof. In the case that an image of the person U1 wearing the glasses capable of reducing the blue light is taken, the reflected blue component is superimposed on the lens part of the taken image, lowering the accuracy in the detection of the eye of the person U1. Therefore, the image generating part 12 multiplies the blue component value of each pixel of the color image by the ratio of 0, in the conversion of the color image acquired by the image acquiring part 11 into the grayscale image. This multiplication prevents the blue component from being superimposed on the lens part of the taken image, allowing generation of a grayscale image at a reduced noise on an area of the eye.

The above-mentioned respective ratios by which the red component value, the green component value, and the blue component value are multiplied are mentioned merely as an example, and the respective ratios may be changed according to characteristics of the lens of the glasses.

The image taken by the image taking device 2 is an image quantized in 8 bits. Therefore, the gray scale image has gradation values from 0 to 255, but this is merely an example. In the case that the image taken by the image taking device 2 is quantized in another number of bits (e.g., 16 bits), the grayscale image may have gradation values that can be represented by this number of bits.

The eye detecting part 13 detects an eye of the person U1 from the grayscale image generated by the image generating part 12. The eye detecting part 13 detects the face region indicative of a face of a person from the grayscale image generated by the image generating part 12. The eye detecting part 13 may detect the face region by inputting the grayscale image to a classifier prepared for detecting the face region. The classifier includes, for example, a Haar cascade classifier. The face region is, for example, a region having a rectangular shape having a size of the entirety of the face.

The eye detecting part 13 detects the eye region by inputting the face region to a classifier prepared for detecting the eye region. The classifier includes, for example, a Haar cascade classifier. The eye region includes an eye. The eye region is, for example, a region having a rectangular shape with an upper side, a lower side, and right and left sides, the upper side being tangent to the upper eyelid, the lower side being tangent to the lower eyelid, one of the right and left sides being tangent to the eye inner corner, and the other of the right and left sides being tangent to the eye outer corner. The eye region may have a rectangular shape having a size of a right or left eye with a predetermined margin. The eye detecting part 13 detects an eye region including the left eye and an eye region including the right eye from the face region.

Hereinafter, the eye region including the left eye is referred to as "the left eye region", and the eye region including the right eye is referred to as "the right eye region". A simple reference to "the eye region" means either of "the left eye region" or "the right eye region". "The left eye" means an eye on the left side in a front view of the person U1, and "the right eye" means an eye on the right side in the front view of the person U1. This relation is merely an example, and may be inversed.

The outputting part 14 outputs the eye information on the eye detected by the eye detecting part 13. The eye information includes, for example, a position of the eye, i.e., the position of the eye region. The outputting part 14 superimposes the eye region detected by the eye detecting part 13 on the color image acquired by the image acquiring part 11 to generate a display picture, and displays the display picture on the display 3.

The memory 20 is a storage device capable of storing various kinds of information, e.g., a random access memory (RAM), a solid state drive (SSD), or a flash memory. The memory 20 serves as a working area for the processor 10. The memory 20 may store the eye information output by the outputting part 14.

Next, the eye detecting process by the eye detecting device 1 in the embodiment 1 will be described.

Figure 3:
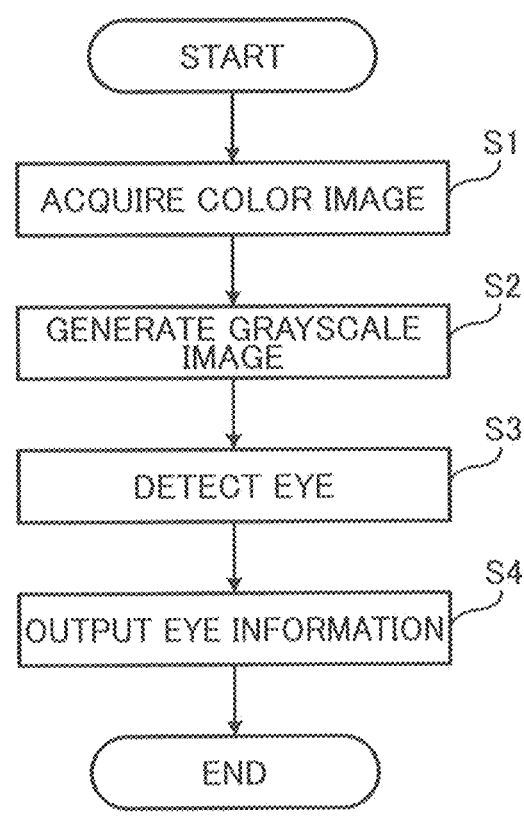
FIG. 3 is a flowchart showing an exemplary eye detecting process of an eye detecting device according to the embodiment 1 of the present disclosure.

FIG. 3 is a flowchart showing an exemplary eye detecting process of the eye detecting device 1 according to the embodiment 1 of the present disclosure. The process shown in the flowchart of FIG. 3 is executed at a predetermined sampling period. The predetermined sampling period is, for example, a frame period of the image taking device 2.

First, in the step S1, the image acquiring part 11 acquires a color image from the image taking device 2.

Figure 4:
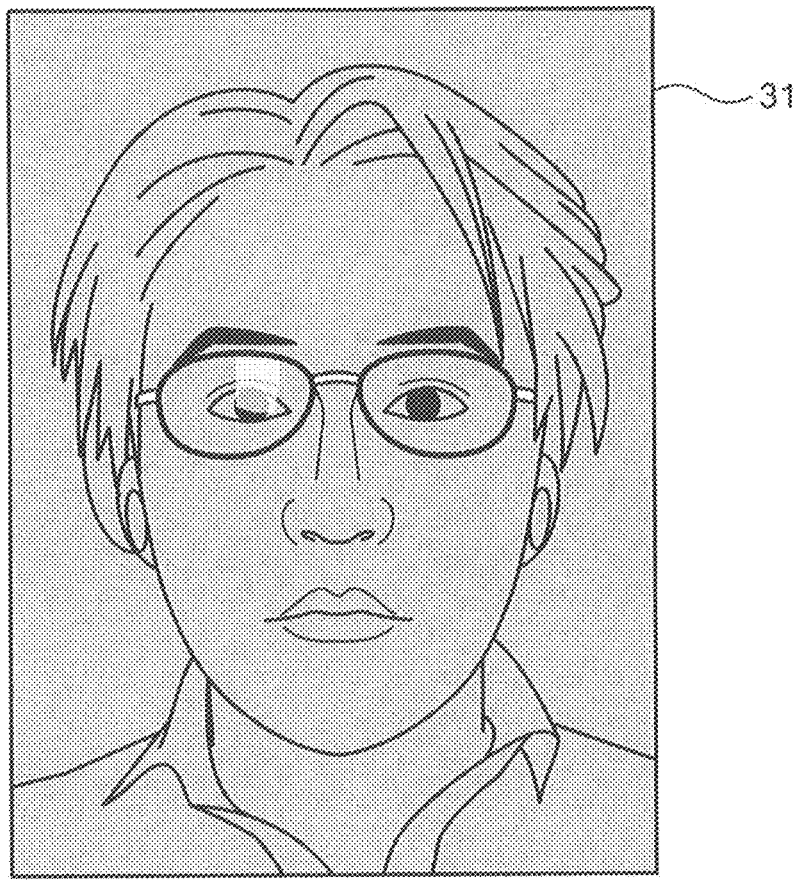
FIG. 4 is an illustration showing an exemplary color image taken by an image taking device according to the embodiment 1.

FIG. 4 is an illustration showing an exemplary color image taken by the image taking device 2 according to the embodiment 1.

In the color image 31 shown in FIG. 4, the person wears glasses capable of reducing the blue light. Therefore, noise of the component of the blue light reflected by the Jell lens of the glasses is superimposed on the left eye of the person.

Reference is back to FIG. 3. Next, in the step S2, the image generating part 12 generates a grayscale image by multiplying each of a red component value, a green component value, and a blue component value of each pixel of the color image acquired by the image acquiring part 11 by a predetermined ratio according to characteristics of a lens of glasses that the person U1 wears; and summing the multiplied red component value, green component value, and blue component value. For example, the image generating part 12 generates the grayscale image by multiplying the red component value, the green component value, and the blue component value of each pixel of the color image by 0.9, 0.1, and 0, respectively.

Figure 5:
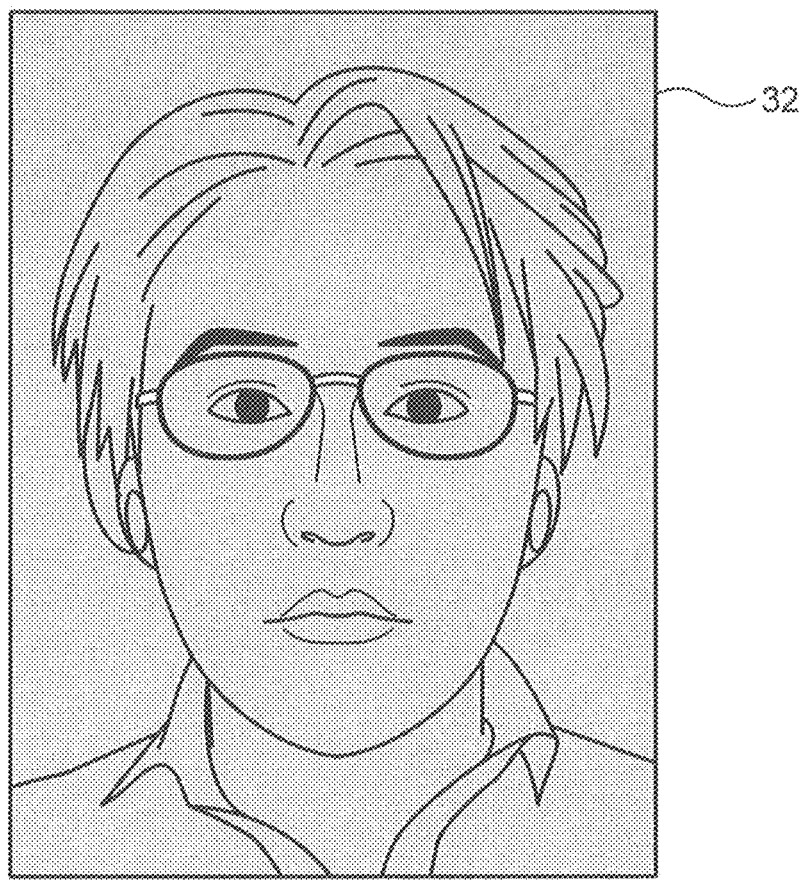
FIG. 5 is an illustration showing an exemplary grayscale image generated from the color image shown in FIG. 4.

FIG. 5 is an illustration showing an exemplary grayscale image generated from the color image shown in FIG. 4.

In the grayscale image 32 shown in FIG. 5, the ratio by which the red component value is multiplied is set to be higher than a normal one and the respective ratios by which the green component value and the blue component value are multiplied are set to be lower than normal ones, thereby removing the noise superimposed on the left lens part of the glasses.

Reference is back to FIG. 3. Next, in the step S3, the eye detecting part 13 detects an eye of the person U1 from the grayscale image generated by the image generating part 12. The eye detecting part 13 detects a face region by inputting the grayscale image to the classifier for detecting the face region. As the face region, the eye detecting part 13 detects a region having a rectangular shape and including an upper portion of the forehead, a lower portion of the chin, and roots of the ears. The face region may include the whole hair. The eye detecting part 13 detects an eye region by inputting the detected face region to the classifier for detecting the eye region. The eye region has a rectangular shape and includes the entirety of an eye.

Next, in the step S4, the outputting part 14 outputs eye information on an eye of a person. The outputting part 14 generates a display picture in which the eye information on the eye of the person is superimposed on the color image and displays the display picture on the display 3. The eye information is, for example, an eye region having a rectangular shape. The outputting part 14 generates a display picture in which an outer edge portion of at least one of the eye regions of the right and left eyes is superimposed on the color image and displays the display picture on the display 3. The display picture in which the eye information is superimposed on the face image is displayed on the display 3 in real time by repeating the eye detecting process shown in FIG. 3 at a predetermined sampling period.

As described above, a grayscale image 32 is generated by multiplying each of a red component value, a green component value, and a blue component value of each pixel of the color image 31 by a predetermined ratio according to characteristics of a lens of glasses that the person wears; and an eye of the person is detected from the grayscale image 32. Thus, even in a device such as a smartphone or a tablet which has a simple configuration, the accuracy in the detection of the eye of the person from the color image 31 can be improved by removing external light or a background reflected in a lens part of the glasses included in the color image 31.

The eye information on the eye detected by the eye detecting part 13 may be used for a process of detecting sightline, a process of detecting an iris, or a process of estimating a viewing distance. The eye information may be used for a process of determining whether the target of the eye detection is a living body. The eye information may be used for a process of determining which of a still image or a video the taken color image is.

Embodiment 2

In the embodiment 1, an eye of a person is detected from a generated grayscale image, and eye information on the detected eye is output. In contrast, in the embodiment 2, an average luminance value of an eye region including the detected eye is calculated. In the case that the calculated average luminance value is higher than a threshold, reflection information indicating that the lens of the glasses reflects external light or a background is output.

Figure 6:
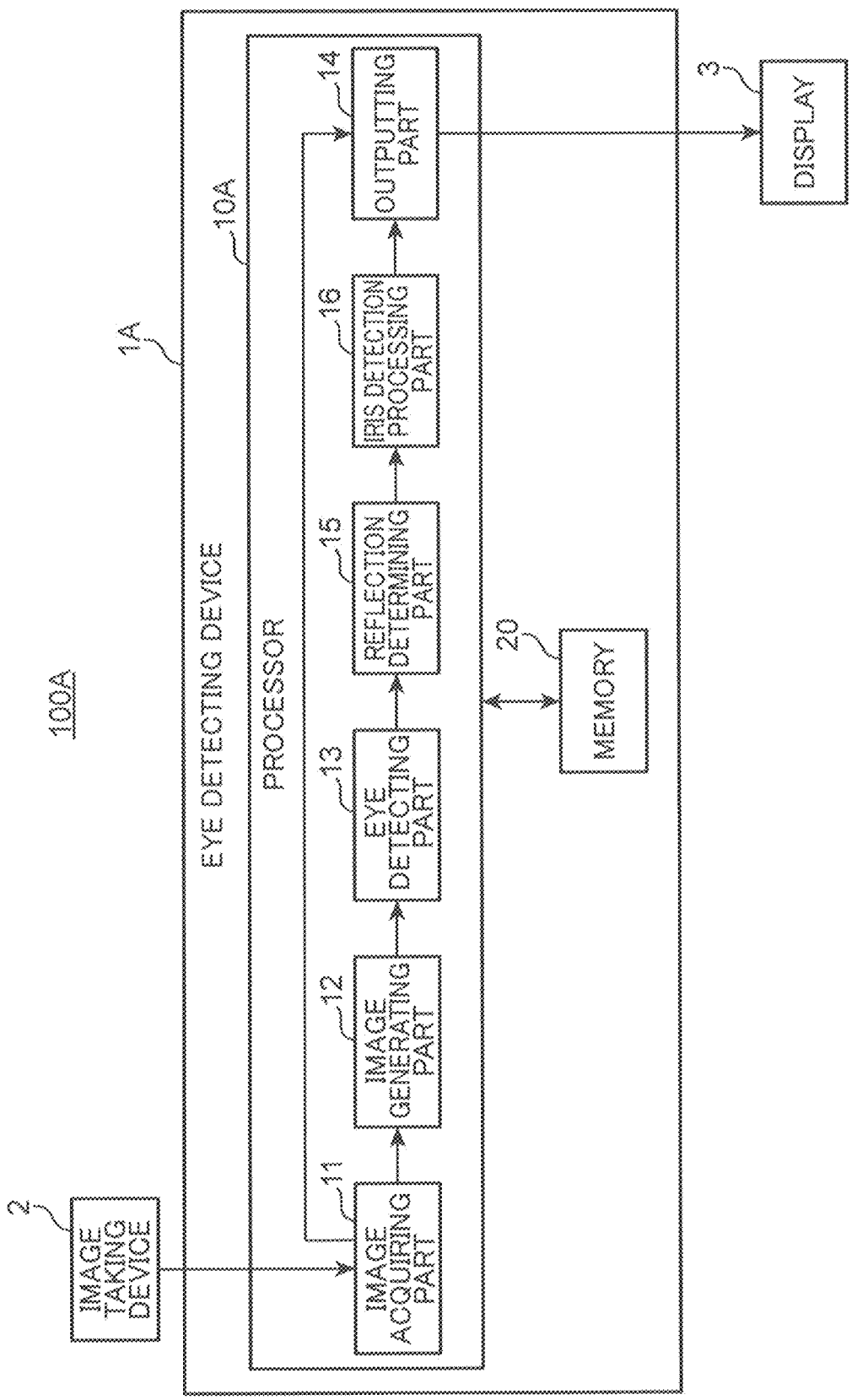
FIG. 6 is a block diagram showing an exemplary whole structure of an eye detecting system according to an embodiment 2 of the present disclosure.

FIG. 6 is a block diagram showing an exemplary whole structure of an eye detecting system 100A according to the embodiment 2 of the present disclosure. In the embodiment 2, the same constituents as those in the embodiment 1 are denoted by the same reference numerals, and the description thereof will be omitted.

The eye detecting device 1A includes a processor 10A and a memory 20. The processor 10A further includes a reflection determining part 15 and an iris detection processing part 16 in comparison with the processor 10 of the eye detecting device 1 in the embodiment 1.

The reflection determining part 15 calculates an average luminance value of the eye region including the eye detected by the eye detecting part 13. The reflection determining part 15 determines whether the calculated average luminance value is higher than a threshold. The reflection determining part 15 outputs reflection information indicating that the lens of the glasses reflects external light or a background, when it is determined that the calculated average luminance value is higher than the threshold.

For example, the image generating part 12 generates a grayscale image by multiplying each of a red component value, a green component value, and a blue component value of each pixel of the color image by a predetermined ratio according to the characteristic of a lens of glasses of reflecting the blue light. In this case, reflection noise due to the blue component included in the eye region can be removed, but reflection noise due to components other than the blue component may remain. Therefore, in the embodiment 2, it is determined on the basis of the generated grayscale image whether the lens of the glasses reflects external light or a background.

Usually, in the case that an image of a person without glasses is taken or in the case that an image is taken with the lens of the glasses having no reflection, the average luminance value of the eye region is likely to decrease, because the colored part (iris) of the eye is in black or dark brown. On the other hand, in the case that an image is taken with the lens of the glasses having a reflection, the colored part (iris) of the eye is brighten. Thus, the average luminance value of the eye region is likely to increase. Therefore, the comparison between the average luminance value in the eye region and the threshold enables determination as to whether the lens of the glasses reflects external light or a background.

The iris detection processing part 16 generates a binary image (first image) in which a pixel having a gradation value smaller than a threshold is represented at a first luminance value and a pixel having a gradation value not smaller than the threshold is represented at a second luminance value, after the eye region is binarized. The iris detection processing part 16 changes the threshold compared with the gradation value in the binarization of the eye region, when the reflection determining part 15 outputs the reflection information. Specifically, the iris detection processing part 16 increases the threshold compared with the gradation value in the binarization of the eye region, when the reflection determining part 15 outputs the reflection information. The first luminance value and the second luminance value are represented in, for example, white and black, respectively. In other words, in the embodiment 2, a binary image in which a dark spot is represented by white and a bright spot is represented by black is generated. The respective luminance values of white and black are represented at, for example, 255 and 0.

The iris detection processing pall 16 generates a binary image (second image) by replacing a pixel which has the second luminance value in a first luminance region having the first luminance value in the generated binary image (first image) and satisfies a predetermined condition with a pixel having the first luminance value. The iris detection processing part 16 calculates iris information including information indicative of at least one of a position and a size of an iris of the person using the binary image (second image).

The first luminance value and the second luminance value may be represented in black and white, respectively.

The outputting part 14 outputs eye information on an eye. The eye information may include the iris information. The outputting part 14 superimposes the iris information calculated by the iris detection processing part 16 on the face image acquired by the image acquiring part 11 to generate a display picture, and displays the display picture on the display 3.

Next, the eye detecting process by the eye detecting device 1A in the embodiment 2 will be described.

Figure 7:
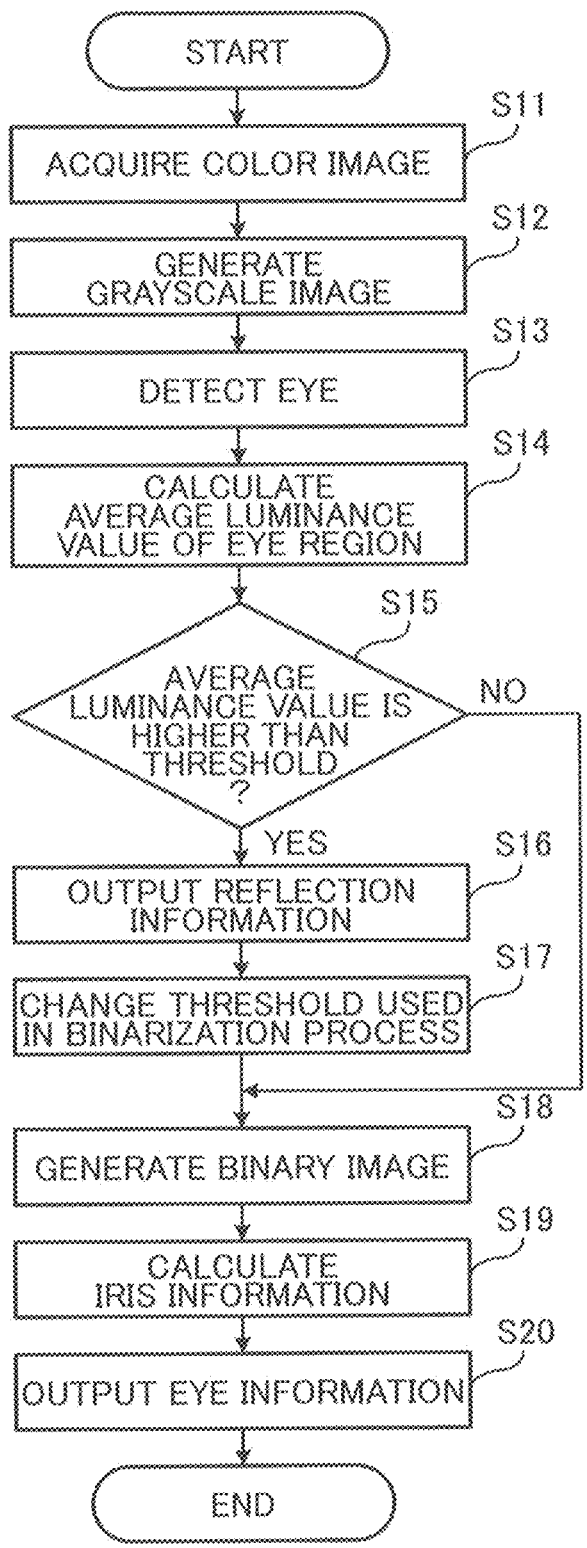
FIG. 7 is a flowchart showing an exemplary eye detecting process of an eye detecting device according to the embodiment 2 of the present disclosure.

FIG. 7 is a flowchart showing an exemplary eye detecting process of the eye detecting device 1A according to the embodiment 2 of the present disclosure.

Since the processings in the steps S11 to S13 are the same as those in the steps S1 to S3 shown in FIG. 3, the description thereof will be omitted.

Next, in the step S14, the reflection determining part 15 calculates the average luminance value of the eye region including the eye detected by the eye detecting part 13. The reflection determining part 15 calculates the average luminance value of the left eye region including the left eye and the average luminance value of the right eye region including the right eye.

Figure 8:
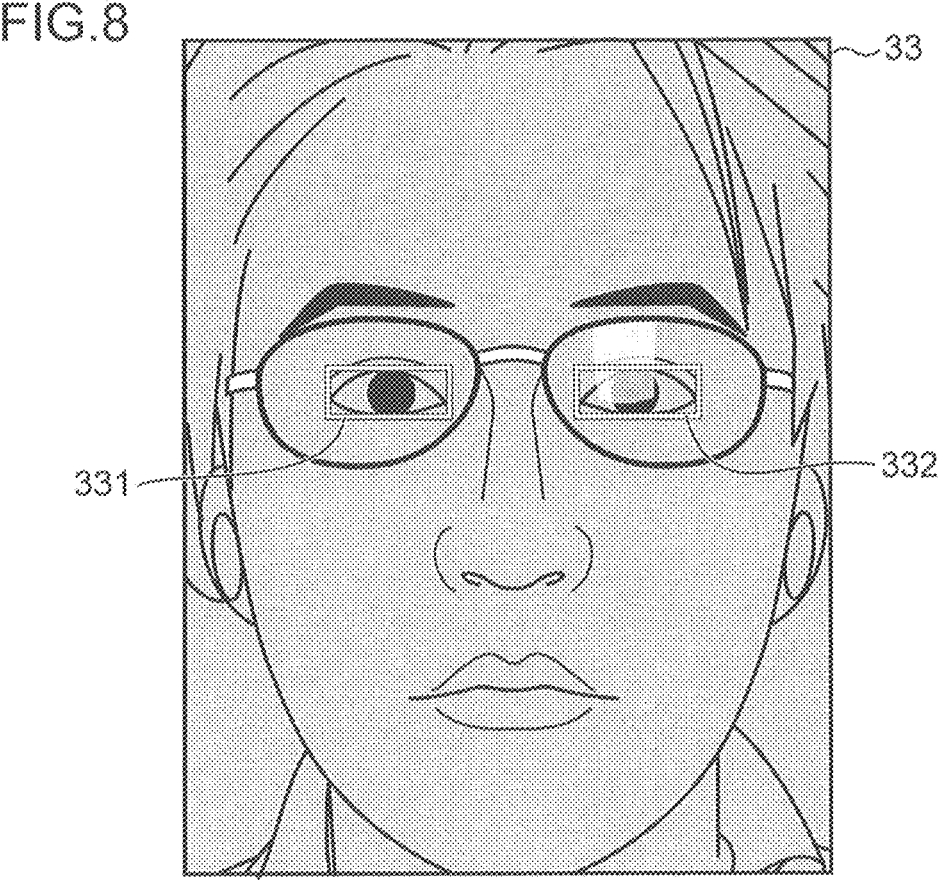
FIG. 8 is an illustration showing an exemplary face region to be detected by an eye detecting part.
Figure 9:
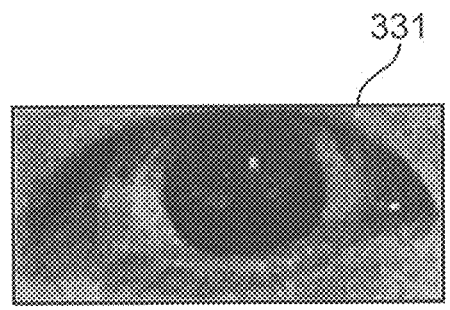
FIG. 9 is an illustration showing an exemplary left eye region to be detected by the eye detecting part.
Figure 10:
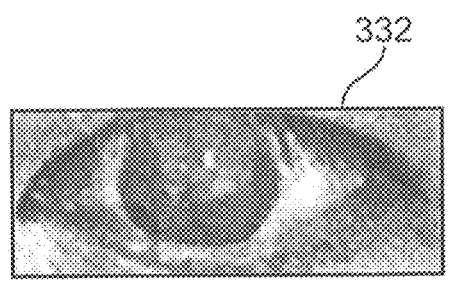
FIG. 10 is an illustration showing an exemplary right eye region to be detected by the eye detecting part.

FIG. 8 is an illustration showing an exemplary face region to be detected by the eye detecting part 13. FIG. 9 is an illustration showing an exemplary left eye region to be detected by the eye detecting part 13. FIG. 10 is an illustration showing an exemplary right eye region to be detected by the eye detecting part 13.

The eye detecting part 13 detects a face region 33 by inputting the grayscale image to the classifier for detecting the face region. The eye detecting part 13 detects a left eye region 331 and a right eye region 332 by inputting the detected face region 33 to the classifier for detecting the eye region. In FIG. 8, the right lens of the glasses reflects external light or a background. Therefore, the right eye region 332 is brighter than the left eye region 331. Specifically, the average luminance value of the right eye region 332 is 139.73 whereas the average luminance value of the left eye region 331 is 109.08.

Reference is hack to FIG. 7. Next, in the step S15, the reflection determining part 15 determines whether the calculated average luminance value is higher than a threshold. In the case that the grayscale image has gradation values of 0 to 255, the threshold is the half value thereof, i.e., 128. When it is determined that the calculated average luminance value is not higher than the threshold in the step S15, the processing proceeds to the step S18. The reflection determining part 15 determines whether the average luminance value of the left eye region is higher than the threshold and determines whether the average luminance value of the right eye region is higher than the threshold.

On the other hand, when it is determined that the calculated average luminance value is higher than the threshold, the reflection determining part 15 outputs, in the step S16, reflection information indicating that the lens of the glasses reflects external light or a background to the iris detection processing part 16. The reflection determining part 15 adds information indicating which of the left eye region and the right eye region has a reflection therein to the reflection information.

Next, in the step S17, the iris detection processing part 16 changes the threshold used in a binarization process. The iris detection processing part 16 executes the binarization process on the eye region of the grayscale image. In this regard, the iris detection processing part 16 is set to increase the threshold used in the binarization process by a predetermined value. The iris detection processing part 16 changes the threshold used in a binarization process on, among the left eye region and the right eye region, a region where a reflection occurs.

Next, in the step S18, the iris detection processing part 16 generates a binary image by executing the binarization process on the eye region of the grayscale image.

Next, in the step S19, the iris detection processing part 16 calculates iris information by executing an iris detecting process on the generated binary image.

The iris detecting process executed by the iris detection processing part 16 will be described.

First, the iris detection processing part 16 divides the binary image into a plurality of local regions by separating the binary image by predetermined pixels in X directions. For example, the iris detection processing part 16 divides the binary image into ten local regions equally in a lateral direction. The binary image is thereby divided into ten local regions in the shape of a strip of which longitudinal direction extends along Y directions. The iris detection processing part 16 is assumed to divide the binary image into ten local regions, but this is merely an example. The number of divisions may be integer from 2 to 9, or may be integer of 11 or more. The Y directions mean the longitudinal directions (vertical directions) of the image taken by the image taking device 2.

The iris detection processing part 16 then calculates the respective average luminance values of the ten local regions.

The iris detection processing part 16 then calculates the X coordinate of an estimated iris central position. The estimated iris central position is a position estimated to be the iris central position and is different from the iris central position that will be finally calculated. The regions of a double eyelid, a thick eyelash, and a false eyelash may be represented as large white regions. In this case, there is likelihood that the region of the white part of an eye is changed over. To prevent such a problem, the estimated iris central position is calculated in the embodiment 2.

The iris detection processing part 16 estimates the coordinate of the midpoint in the X directions of the local region that has the maximum average luminance value among the plurality of local regions to be the X coordinate of the estimated iris central position. In this regard, due to the width in the X directions of the local region, there is a case where the midpoint of the local region in the X directions is not appropriate for the X coordinate of the estimated iris central position. In this case, the left or right edge of the local region in the X directions may be estimated to be the X coordinate of the estimated iris central position.

The iris detection processing part 16 then calculates the Y coordinate of the estimated iris central position. In the local region where the X coordinate of the estimated iris central position is present, the iris detection processing part 16 detects the uppermost end point and the lowermost end point of the white pixels, and calculates the midpoint of the uppermost end point and the lower most end point to be the Y coordinate of the estimated iris central position. In this regard, the uppermost end point and the lowermost end point may be detected in a left local region or a right local region adjacent to the local region, due to the eyelash and make-up. Therefore, the iris detection processing part 16 may calculate the respective uppermost end points and the respective lowermost end points of the local region where the X coordinate of the estimated iris central position is present, and of the two local regions that are adjacent to the local region, i.e., the left local region and the right local region; calculate the average uppermost end point by averaging the three calculated uppermost end points and calculate the average lowermost end point by averaging the three calculated lowermost end points; and estimates the midpoint of the average uppermost end point and the average lowermost end point to be the Y coordinate of the estimated iris central position.

The iris detection processing part 16 then executes a change-over process on the binary image. In the visible light image, a cornea may reflect external light or a background due to the brightness of the surroundings. In the case that this reflection is large, a region in bright color such as white appears within the colored part of the eye in black or brown. In this case, an island region in black appears within a region of the colored part of the eye after the image of the eye is binarized, which prevents highly accurate detection of the iris information. Therefore, in the embodiment 2, a change-over process of changing over the island region in black is executed.

The details of the change-over process are as follows. First, the iris detection processing part 16 sets a vertical line passing through the X coordinate of the estimated iris central position and parallel to the Y directions in the binary image. The iris detection processing part 16 then detects the uppermost white pixel on the vertical line in the binary image as an upper end pixel. The iris detection processing part 16 then detects the lowermost white pixel on the vertical line in the binary image as a lower end pixel. The iris detection processing part 16 then determines whether a distance between the upper end pixel and the lower end pixel is larger than a first reference distance. When the iris detection processing part 16 determines that the distance between the upper end pixel and the lower end pixel is larger than the first reference distance, the iris detection processing part 16 estimates a black pixel between the upper end pixel and the lower end pixel on the vertical line to be the black pixel that satisfies a predetermined condition; and replaces the black pixel with a white pixel. On the other hand, when the iris detection processing part 16 determines that the distance between the upper end pixel and the lower end pixel is not larger than the first reference distance, the replacement of the vertical line is not performed. A proper first reference distance is determined, for example, on the basis of an estimated iris diameter.

The iris detection processing part 16 executes the change-over process on each vertical line within a left reference range from the estimated iris central position toward the left in the X directions and on each vertical line within a right reference range from the estimated iris central position toward the right in the X directions. The sum of the left reference range and the right reference range is an exemplary second reference distance. An exemplary length of the left reference range is the same as that of the right reference distance. The second reference distance is, for example, slightly longer than the estimated iris diameter. The change-over process can be thereby executed intensively on the vertical lines set in the region of the colored part of the eye.

The iris detection processing part 16 then detects a left edge pixel and a right edge pixel of the region of the colored part of the eye. In the white region of the binary image, the iris detection processing part 16 examines the change in luminance value pixel by pixel from the estimated iris central position to the right and the left in the X directions; detects the first left black pixel therefrom in the X directions as the left edge pixel; and detects the first right black pixel therefrom in the X directions as the right edge pixel.

The iris detection processing part 16 then determines the middle position of the left edge pixel and the right edge pixel to be the X coordinate of the iris central position.

The iris detection processing part 16 then detects an upper edge pixel and a lower edge pixel of the region of the colored part of the eye. In the white region of the binary image, the iris detection processing part 16 examines the change in luminance value pixel by pixel from the X coordinate of the iris central position upward and downward in the Y directions; detects the first upper black pixel therefrom in the Y directions as the upper edge pixel; and detects the first lower black pixel therefrom in the Y directions as the lower edge pixel.

The iris detection processing part 16 then determines the middle position of the upper edge pixel and the lower edge pixel to be the Y coordinate of the iris central position. Thus, the iris central position is calculated.

The iris detection processing part 16 then calculates an iris radius. The iris detection processing part 16 determines the distance between the iris central position and the left edge pixel, the distance between the iris central position and the right edge pixel, or the average value of these distances to be the iris radius. Alternatively, the iris detection processing part 16 may determine the distance between the iris central position and the upper edge pixel, the distance between the iris central position and the lower edge pixel, or the average value of these distances to be the iris radius. The iris detection processing part 16 may determine the average value of these four distances to be the iris radius. In addition, the iris detection processing part 16 may determine a circle having the center at the iris central position and the radius of the iris radius to be an outer edge of the iris.

The iris detecting process is as described above.

Next, in the step S20, the outputting part 14 outputs eye information on an eye of a person. The eye information includes the iris information calculated by the iris detection processing part 16. The outputting part 14 generates a display picture in which the iris information calculated by the iris detection processing part 16 is superimposed on the color image, and displays the display picture on the display 3. The iris information includes, for example, at least one of the iris central position, the iris radius, and the outer edge of the iris of the right and left eyes.

As described above, the eye region is brighter in the case that the lens part of the glasses reflects external light or a background than in the case that the lens part of the glasses does not reflect external light or a background. Thus, the comparison between the average luminance value in the eye region and the threshold enables detection of a remaining portion of the external light or background reflected in the lens part of the glasses that has not yet been removed in the generation of the grayscale image.

In the embodiment 2, the reflection determining part 15 outputs the reflection information to the iris detection processing part 16, which the present disclosure is not particularly limited to. A reflection of external light or a background in a lens of glasses may disappear when the person changes the surroundings. Therefore, the processor 10A may further include a notification part for notifying the person that a reflection occurs in the lens of the glasses. The reflection determining part 15 may output the reflection information to the notification part. The notification part notifies the person that a reflection occurs in the lens of the glasses when acquiring the reflection information. In this case, the notification part may display on the display 3 a picture of notifying the person that a reflection occurs in the lens of the glasses. The notification part may output sound of notifying the person that a reflection occurs in the lens of the glasses from a speaker.

The iris detecting process described above may be executed in the embodiment 1. Specifically, the processings in the steps S18 to S20 in FIG. 7 may be executed after the processings in the steps S1 to S3 in FIG. 3 are executed.

The eye detecting device 1A may further include a viewing distance estimating part which estimates a viewing distance between a target and an eye of a person on the basis of the iris information calculated by the iris detection processing part 16. The viewing distance estimating part may calculate a first value indicative of a pixel number for the size of the iris detected by the iris detection processing part 16. The viewing distance estimating part may acquire a resolution of a color image and calculate a third value indicative of an actual dimension of one pixel on the basis of the first value and a second value indicative of a predetermined inherent dimension for the size of the iris. The viewing distance estimating part may estimate a viewing distance corresponding to the acquired resolution and the calculated third value, on the basis of relational information representing a relation among the resolution, the third value, and the viewing distance.

Embodiment 3

In the embodiment 1, a grayscale image is generated by multiplying each of a red component value, a green component value, and a blue component value of each pixel of the color image by a predetermined ratio according to characteristics of a lens of glasses that the person wears. In contrast, in the embodiment 3, it is determined whether a person wears glasses. When it is determined that the person wears the glasses, a grayscale image is generated by method according to the embodiment 1.

Figure 11:
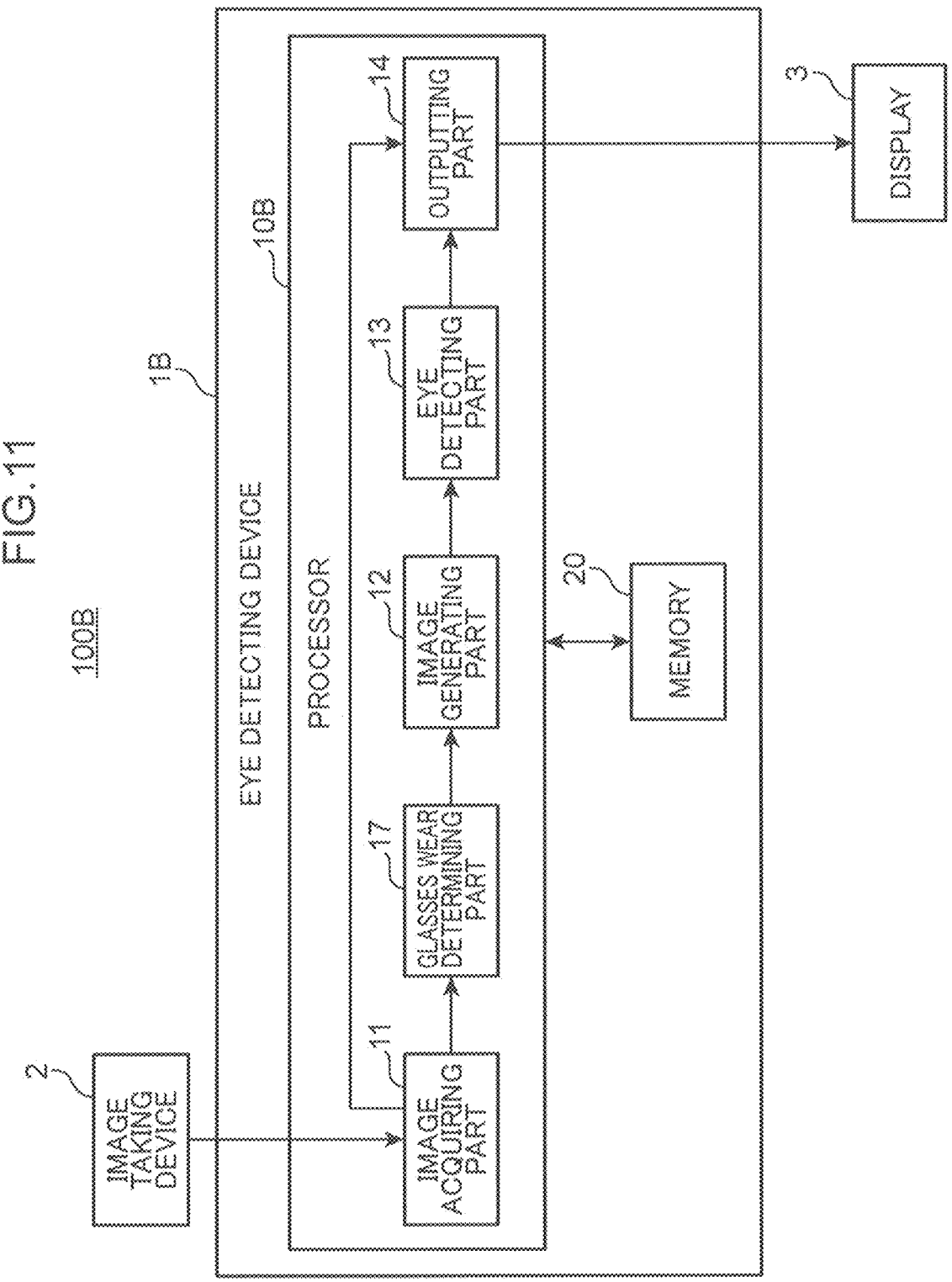
FIG. 11 is a block diagram showing an exemplary whole structure of an eye detecting system according to an embodiment 3 of the present disclosure.

FIG. 11 is a block diagram showing an exemplary whole structure of an eye detecting system 100B according to the embodiment 3 of the present disclosure. In the embodiment 3, the same constituents as those in the embodiment 1 are denoted by the same reference numerals, and the description thereof will be omitted.

The eye detecting device 1B includes a processor 10B and a memory 20. The processor 10B further includes a glasses wear determining part 17 in comparison with the processor 10 of the eye detecting device 1 in the embodiment 1.

The glasses wear determining part 17 generates a binary image from the color image acquired by the image acquiring part 11. The glasses wear determining part 17 extracts from the binary image an estimated glasses region where the glasses are estimated to be present. The glasses wear determining part 17 determines whether the person wears the glasses, on the basis of a length in a horizontal direction of a white region where a plurality of white pixels continue in the extracted estimated glasses region. When the glasses wear determining part 17 determines that the person does not wear the glasses, the eye detecting part 13 detects an eye of the person from the color image. On the other hand, when the glasses wear determining part 17 determines that the person wears the glasses, the image generating part 12 generates a grayscale image from the color image.

Next, the eye detecting process by the eye detecting device 1B in the embodiment 3 will be described.

Figure 12:
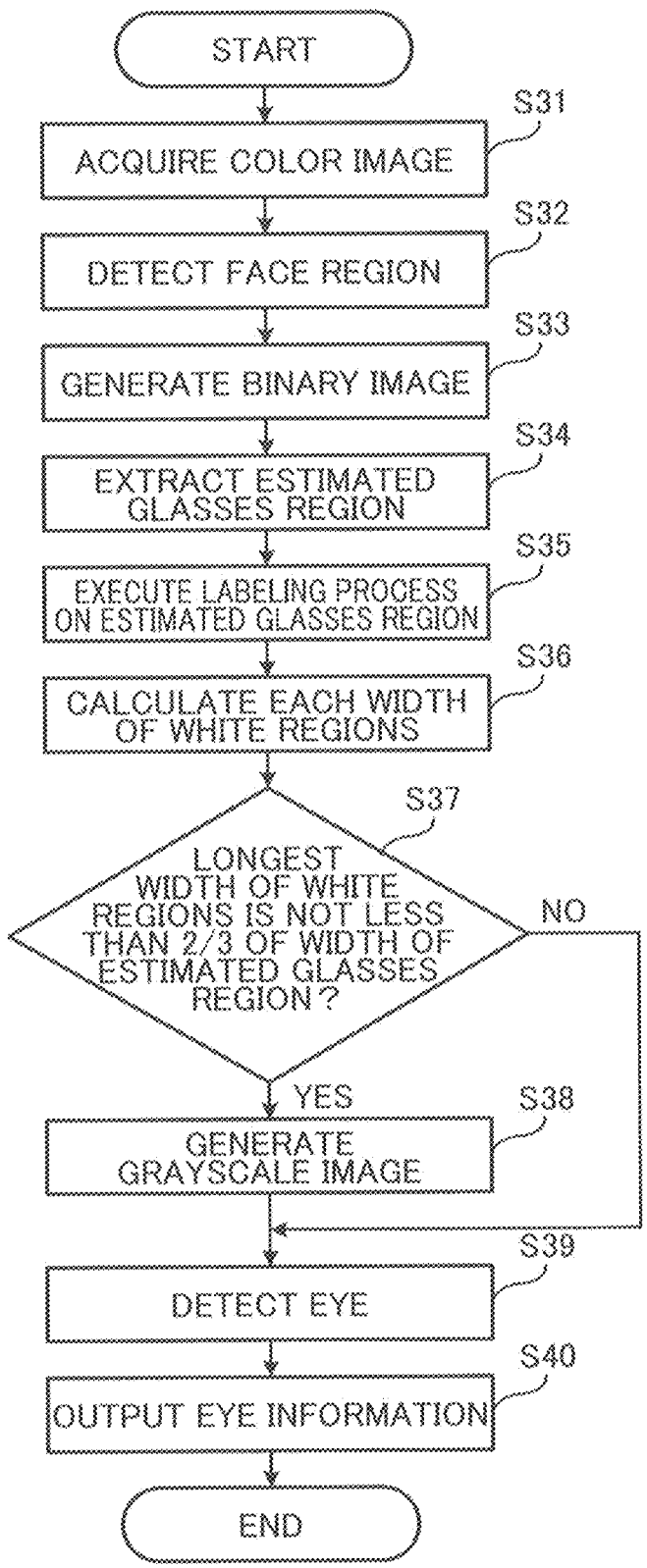
FIG. 12 is a flowchart showing an exemplary eye detecting process of an eye detecting device according to the embodiment 3 of the present disclosure.

FIG. 12 is a flowchart showing an exemplary eye detecting process of the eye detecting device 1B according to the embodiment 3 of the present disclosure.

Since the processing in the step S31 is the same as that in the step S1 shown in FIG. 3, the description thereof will be omitted.

Next, in the step S32, the glasses wear determining part 17 detects a face region from the color image acquired by the image acquiring part 11. The glasses wear determining part 17 detects the face region by inputting the color image to the classifier for detecting the face region.

Next, in the step S33, the glasses wear determining part 17 generates a binary image in which a pixel having a gradation value smaller than a threshold is represented at a first luminance value and a pixel having a gradation value not smaller than the threshold is represented at a second luminance value, after the detected face region is binarized. In the case that the face region is occupied by the color image, the glasses wear determining part 17 may convert the face region into, for example, a grayscale image having gradation values from 0 to 255, and execute the binarization process on the converted grayscale image. The binarization process is executed, for example, by Otsu's method. The first luminance value and the second luminance value are represented in, for example, white and black, respectively. In other words, in this embodiment, a binary image in which a dark spot is represented by white and a bright spot is represented by black is generated. The respective luminance values of white and black are represented at, for example, 255 and 0.

The glasses wear determining part 17 executes a typical converting process in the conversion of the color image into the grayscale image. The typical converting process into the grayscale image is, for example, a process of calculating the average of each gradation value of the red component, the green component, and the blue component of each pixel forming the face region. The glasses wear determining part 17 may calculate the pixel value V of each pixel of the grayscale image in the following equation (2).

$$V = 0.299 \cdot R + 0.587 \cdot G + 0.114 \cdot B \quad (2)$$

In the equation (2) above, R represents a red component value of each pixel of the color image, G represents a green component value of each pixel of the color image, and B represents a blue component value of each pixel of the color image.

Figure 13:
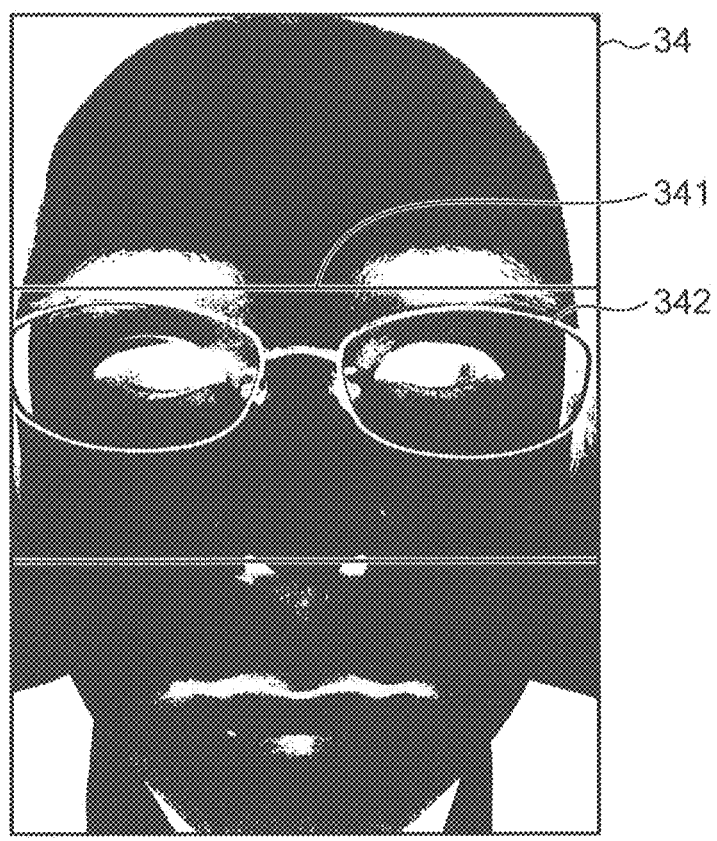
FIG. 13 is an illustration showing an exemplary binary image of a face region in the present embodiment 3.

FIG. 13 is an illustration showing an exemplary binary image of a face region in the present embodiment 3. In FIG. 13, a generated binary image 34 has dark parts of the face region such as an eye, an eyebrow, a nostril, a lip, hair, a frame of glasses which are represented by white and bright parts of the face region such as skin which are represented by black.

Reference is back to FIG. 12. Next, in the step S34, the glasses wear determining part 17 extracts from the binary image an estimated glasses region where the glasses are estimated to be present. On the basis of a typical ratio of a face of a person, a region between the respective lines indicative of the positions of 3/10 and 6/10 of the face region from the upper side thereof is extracted as the estimated glasses region. As shown in FIG. 13, the estimated glasses region 341 is between the respective lines indicative of the positions of 3/10 and 6/10 of the face region from the upper side thereof in the binary image 34.

Reference is back to FIG. 12. Next, in the step S35, the glasses wear determining part 17 executes a labeling process on the extracted estimated glasses region 341. In the labeling process, an identical number is assigned to a plurality of continuing white pixels in the binary image. By the labeling process, a plurality of white regions each consisting of a plurality of continuing white pixels are detected from the estimated glasses region 341. As shown in FIG. 13, in the case that the person wears the glasses, a white region 342 representing the frame of the glasses is detected. The white region 342 consists of a plurality of white pixels continuing in the horizontal direction.

By extracting a binary image of the estimated glasses region 341 from the binary image 34 of the face region in advance as described above, the area to undergo the labeling process can be narrowed down, thereby shortening the time necessary for the labeling process.

Reference is back to FIG. 12. Next, in the step S36, the glasses wear determining part 17 calculates each width (length in the horizontal direction) of the white regions where a plurality of white pixels continue in the extracted estimated glasses region 341.

Next, in the step S37, the glasses wear determining part 17 determines whether the longest width of the white regions is not less than ⅔ of the width of the estimated glasses region. When it is determined that the longest width of the white regions is not less than ⅔ of the width of the estimated glasses region (YES in the step S37), the image generating part 12 generates a grayscale image in the step S38 by multiplying each of a red component value, a green component value, and a blue component value of each pixel of the color image acquired by the image acquiring part 11 by a predetermined ratio according to characteristics of a lens of glasses that the person U1 wears; and summing the multiplied red component value, green component value, and blue component value.

The white region 342 indicative of the frame of the glasses consists of a plurality of white pixels continuing in the horizontal direction. When the longest width of the white regions is not less than ⅔ of the width of the estimated glasses region, it means that the person of which image is taken wears the glasses. Thus, the glasses wear determining part 17 can determine that the person wears the glasses when the length of the white region 342 is not less than ⅔ of the width of the estimated glasses region 341.

On the other hand, when it is determined that the longest width of the white regions is less than ⅔ of the width of the estimated glasses region (NO in the step S37), the processing proceeds to the step S39. When the longest width of the white regions is less than ⅔ of the width of the estimated glasses region, it means that the person of which image is taken does not wear the glasses.

Since the processings in the steps S38 to S40 are the same as those in the steps S2 to S4 in FIG. 3, the description thereof will be omitted.

As described above, an eye of the person is detected from the color image without generation of a grayscale image when it is determined that the person does not wear the glasses. On the other hand, a grayscale image is generated in order to remove the external light or background reflected in the lens part of the glasses included in the color image when it is determined that the person wears glasses. Accordingly, only when the person wears the glasses, a process of removing external light or a background reflected in the lens part of the glasses included in the color image is executed.

A glasses wear determination in a variation of the embodiment 3 will be described.

Figure 14:
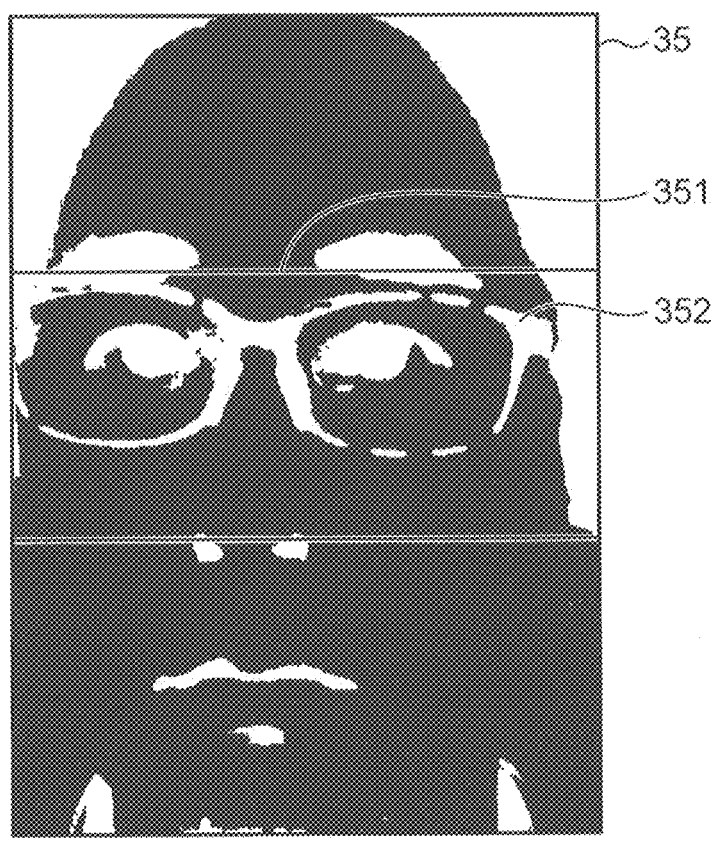
FIG. 14 is an illustration showing an exemplary binary image of a face region in a variation of the present embodiment 3.

FIG. 14 is an illustration showing an exemplary binary image of a face region in a variation of the present embodiment 3. In FIG. 14, a generated binary image 35 has dark parts of the face region such as an eye, an eyebrow, a nostril, a lip, hair, a frame of glasses which are represented by white and bright parts of the face region such as skin which are represented by black.

In FIG. 13 mentioned above, the white region indicative of the frame of the glasses is detected as an island. However, the white region indicative of the frame of the glasses may not be detected as an island, in the case that external light shines the frame of the glasses or in the case that the frame of the glasses is colored. In FIG. 14, the frame of the glasses is not detected as an island, but as a plurality of white regions 352.

Therefore, the glasses wear determining part 17 may determine whether the number of white regions which have a width not shorter than a predetermined length is not less than a predetermined number. When the number of the white regions having a width not shorter than the predetermined length is not less than the predetermined number, it can be determined that the person of which image is taken wears the glasses. When the number of the white regions having a width not shorter than the predetermined length is less than the predetermined number, it can be determined that the person of which image is taken does not wear the glasses.

In the variation of the embodiment 3, the glasses wear determining part 17 determines in the step S37 in FIG. 12 whether the number of white regions which have a width not shorter than the predetermined length is not less than the predetermined number. When it is determined that the number of the white regions having a width not shorter than the predetermined length is not less than the predetermined number (YES in the step S37), the processing proceeds to the step S38. When it is determined that the number of the white regions having a width not shorter than the predetermined length is less than the predetermined number (NO in the step S37), the processing proceeds to the step S39.

The eye detecting process in the embodiment 3 may be combined with the eye detecting process in the embodiment 2. In this combination, the processings following the processing in the step S14 in FIG. 7 may be executed after the processings in the steps S31 to S39 in FIG. 12 are executed.

Embodiment 4

In the eye detecting process using a color image, the brightness in the place where the image is taken affects occurrence of reflection in the lens of the glasses. Therefore, in the embodiment 4, an average luminance value of a face region in the color image is calculated. In the case that the average luminance value is higher than a threshold, the subsequent eye detecting processings are executed. In the case that the average luminance value is not higher than the threshold, the subsequent eye detecting processings are not executed.

Figure 15:
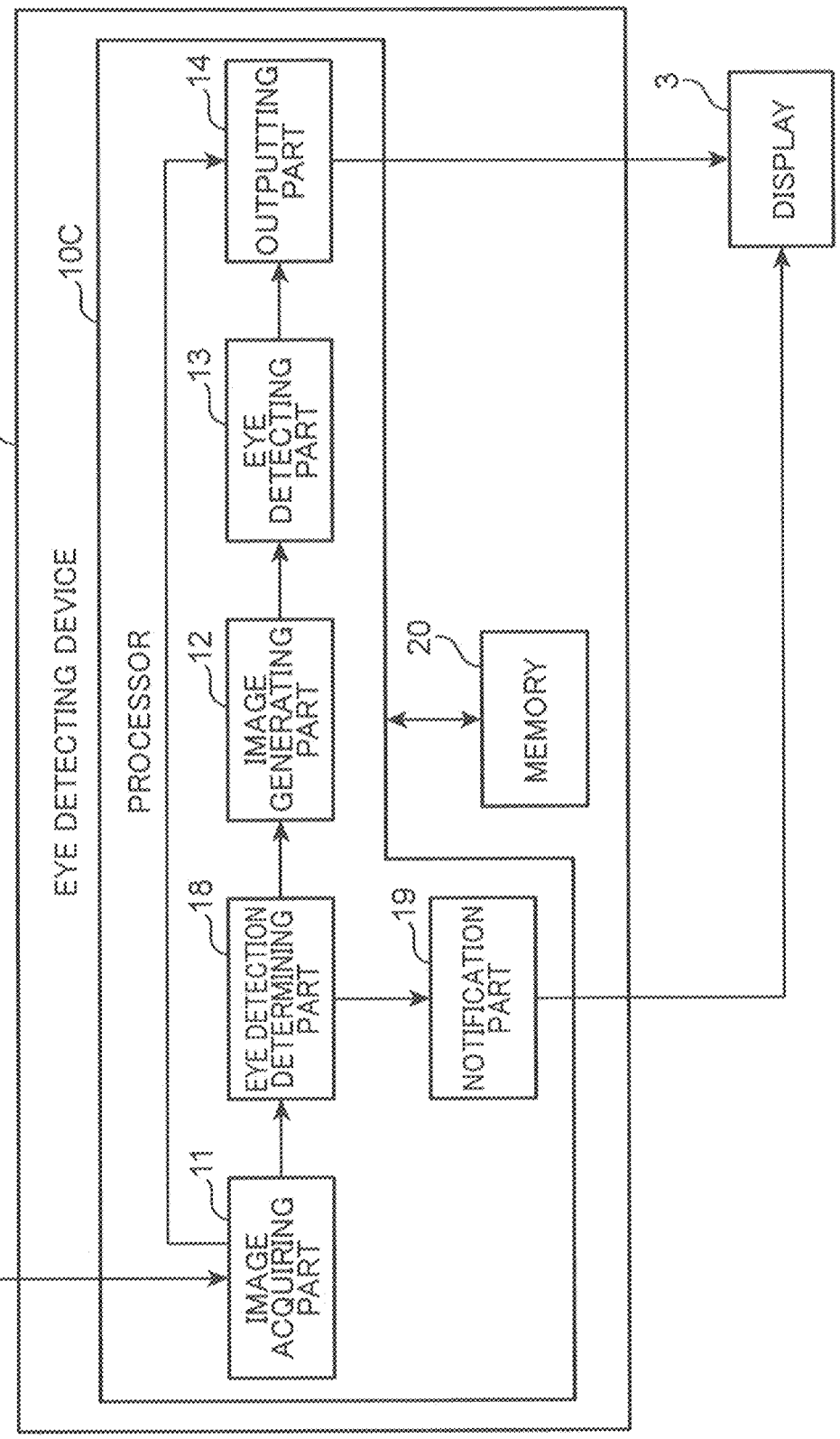
FIG. 15 is a block diagram showing an exemplary whole structure of an eye detecting system according to an embodiment 4 of the present disclosure.

FIG. 15 is a block diagram showing an exemplary whole structure of an eye detecting system 100C according to the embodiment 4 of the present disclosure. In the embodiment 4, the same constituents as those in the embodiment 1 are denoted by the same reference numerals, and the description thereof will be omitted.

The eye detecting device 1C includes a processor 10C and a memory 20. The processor 10C further includes an eye detection determining part 18 and a notification part 19 in comparison with the processor 10 of the eye detecting device 1 in the embodiment 1.

The eye detection determining part 18 detects a face region including a face of the person from the color image acquired by the image acquiring part 11. The eye detection determining part 18 calculates an average luminance value of the face region. The eye detection determining part 18 determines that the eye is detectable, when the calculated average luminance value is higher than a threshold. On the other hand, the eye detection determining part 18 determines that the eye is undetectable, when the calculated average luminance value is not higher than the threshold.

The image generating part 12 generates a grayscale image from the color image when the eye detection determining part 18 determines that the eye is detectable.

The notification part 19 notifies the person that the eye is undetectable, when the eye detection determining part 18 determines that the eye is undetectable. The notification part 19 displays on the display 3 a picture of notifying the person that the eye is undetectable, when the eye detection determining part 18 determines that the eye is undetectable. The notification part 19 may output sound of notifying the person that the eye is undetectable from a speaker, when the eye detection determining part 18 determines that the eye is undetectable.

Next, the eye detecting process by the eye detecting device 1C in the embodiment 4 will be described.

Figure 16:
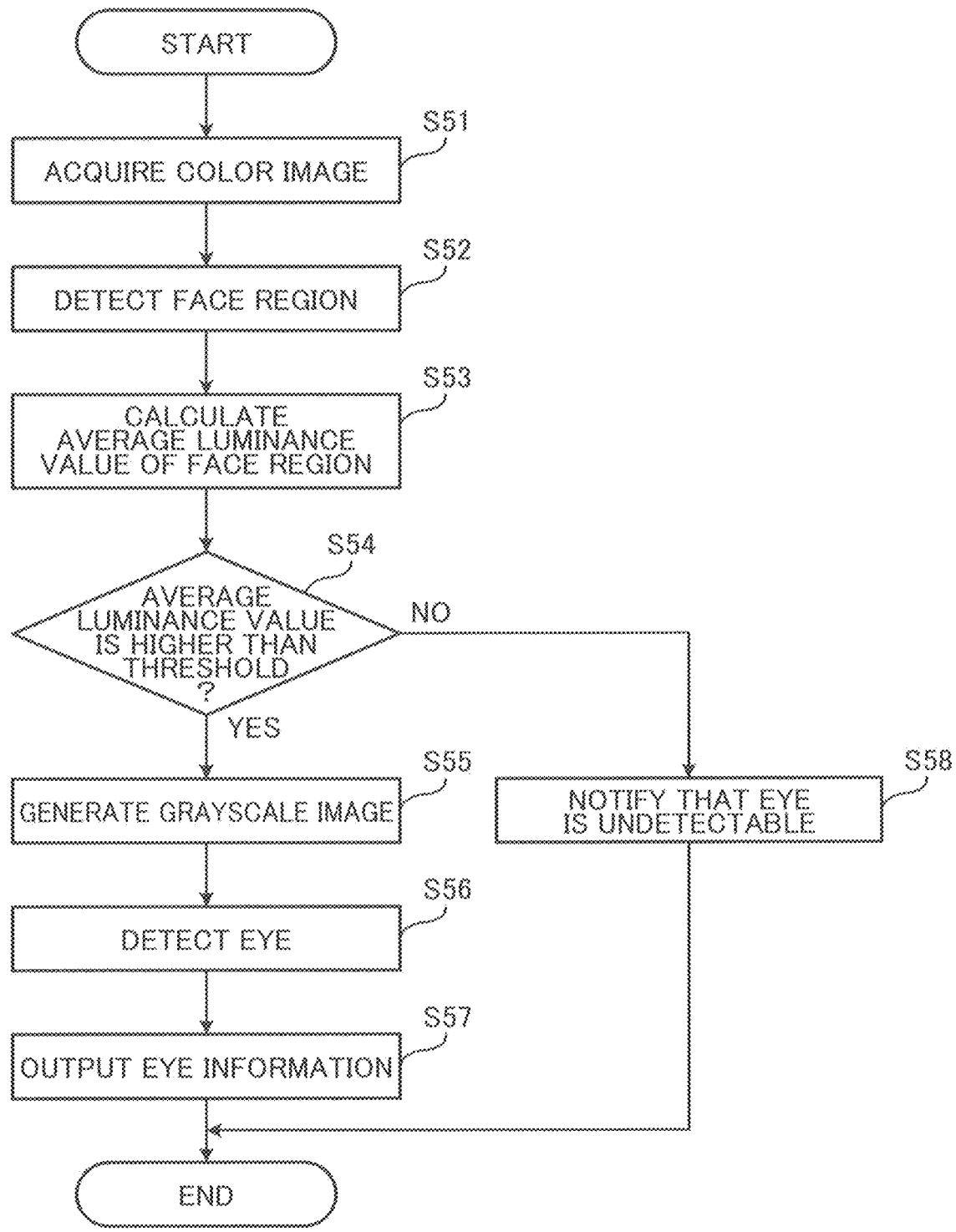
FIG. 16 is a flowchart showing an exemplary eye detecting process of an eye detecting device according to the embodiment 4 of the present disclosure.

FIG. 16 is a flowchart showing an exemplary eye detecting process of the eye detecting device 1C according to the embodiment 4 of the present disclosure.

Since the processing in the step S51 is the same as that in the step S1 shown in FIG. 3, the description thereof will be omitted.

Next, in the step S52, the eye detection determining part 18 detects a face region from the color image acquired by the image acquiring part 11. The eye detection determining part 18 detects the face region by inputting the color image to the classifier for detecting the face region.

Next, in the step S53, the eye detection determining part 18 calculates the average luminance value of the detected face region. In the case that the face region is occupied by the color image, the eye detection determining part 18 may convert the face region into, for example, a grayscale image having gradation values from 0 to 255, and calculate the average luminance value of the face region of the converted grayscale image. The converting process herein is a typical one to convert a color image into a grayscale image.

Next, in the step S54, the eye detection determining part 18 determines whether the average luminance value is higher than a threshold.

Figure 17:
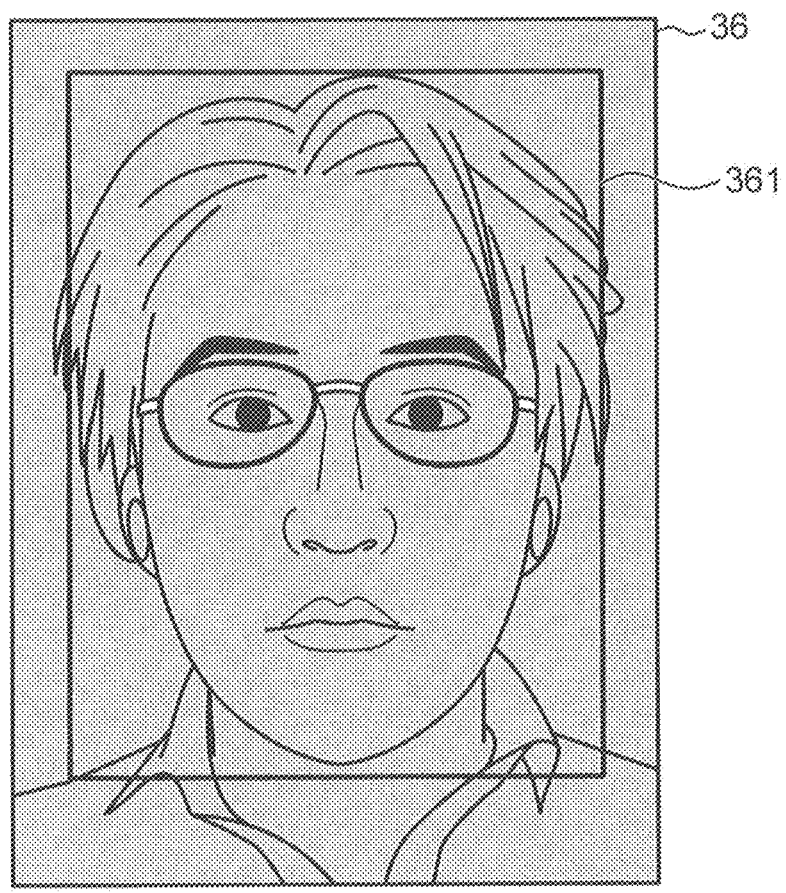
FIG. 17 is an illustration showing an exemplary face region having an average luminance value higher than a threshold in the present embodiment 4.
Figure 18:
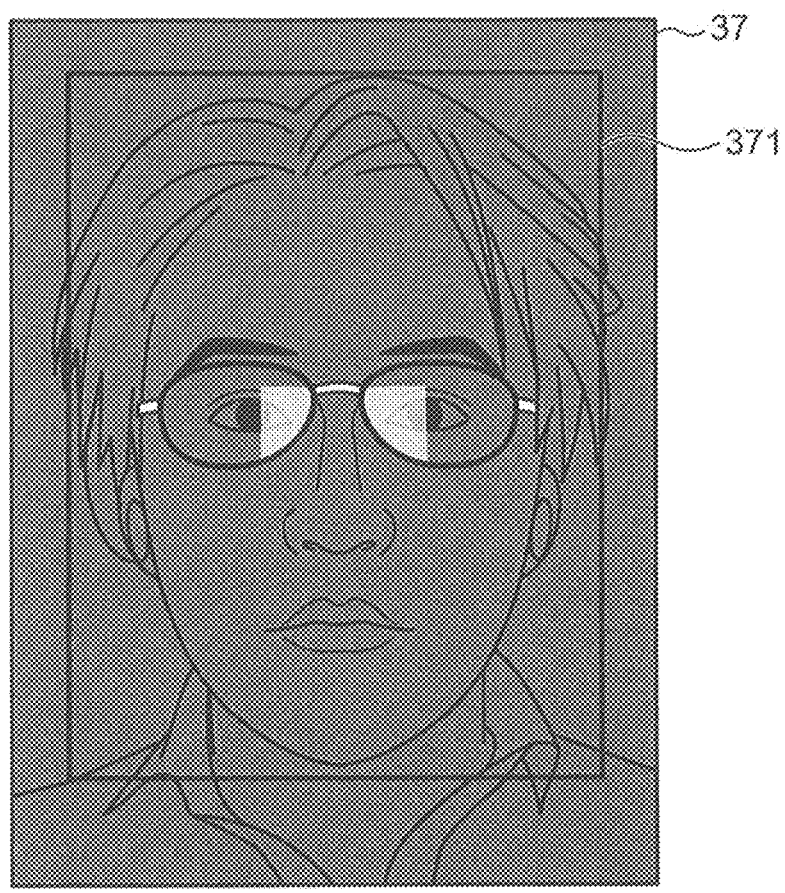
FIG. 18 is an illustration showing an exemplary face region having an average luminance value not higher than the threshold in the present embodiment 4.

FIG. 17 is an illustration showing an exemplary face region having an average luminance value higher than a threshold in the present embodiment 4. FIG. 18 is an illustration showing an exemplary face region having an average luminance value not higher than the threshold in the present embodiment 4.

In FIG. 17, a face region 361 is detected from a color image 36. In FIG. 18, a face region 371 is detected from a color image 37.

Unlike an image having an infrared light wavelength region, a color image having a visible light wavelength region allows the eye detection even in the case that the person wears the glasses. However, a color image acquired in a dark place, where the lens of the glasses is more likely to reflect external light or a background, may lower the accuracy in detection of an eye. Particularly, in the case that a color image is acquired by an image taking device 2 in a smartphone and the acquired color image is displayed on a display 3 of the smartphone in a dark place, the lens of the glasses is more likely to reflect the screen of the display 3.

For example, the color image 36 shown in FIG. 17 is acquired in a place of about 850 lux. The color image 37 shown in FIG. 18 is acquired in a place of about 10 lux.

The average luminance value of the face region 361 detected from the color image 36 is 130, and the average luminance value of the face region 371 detected from the color image 37 is 96. As shown in FIG. 18, in the color image taken in such a place that the average luminance value of the face region 371 becomes 100 or less, the lens of the glasses reflects external light or a background. Therefore, it is difficult to detect an eye accurately using the face region 371, in which the lens of the glasses reflects the external light or background.

Therefore, the eye detection determining part 18 determines whether the average luminance value of the face region is higher than a threshold. When it is determined that the average luminance value of the face region is higher than the threshold, the subsequent eye detecting processings are executed. When it is determined that the average luminance value of the face region is not higher than the threshold, the subsequent eye detecting processings are not executed. The threshold is, for example, 100.

Reference is back to FIG. 16. When it is determined that the average luminance value is higher than the threshold (YES in the step S54), the image generating part 12 generates a grayscale image in the step S55 by multiplying each of a red component value, a green component value, and a blue component value of each pixel of the color image acquired by the image acquiring part 11 by a predetermined ratio according to characteristics of a lens of glasses that the person U1 wears; and summing the multiplied red component value, green component value, and blue component value.

Since the processings in the steps S55 to S57 are the same as those in the steps S2 to S4 in FIG. 3, the description thereof will be omitted.

On the other hand, when it is determined that the average luminance value is not higher than the threshold (NO in the step S54), The notification part 19 notifies the person that the eye is undetectable in the step S58. In this step, the notification part 19 displays on the display 3 a picture of notifying the person that the eye is undetectable. For example, the picture notifies that the person should move to a brighter place because the current place where an image is taken is dark and the eye may be undetectable.

As described above, when a person is in a dark place, the lens part of the glasses is more likely to reflect external light. In other words, in the eye detecting process using a color image, the brightness in the place where the image is taken affects occurrence of reflection in the lens of the glasses. Therefore, it is determined that the eye is detectable when the average luminance value of the face region is higher than a threshold; and it is determined that the eye is undetectable when the average luminance value of the face region is not higher than the threshold. Accordingly, only when the eye is detectable, a process of removing external light or a background reflected in the lens part of the glasses included in the color image is executed.

The person is notified that the eye is undetectable, when it is determined that the eye is undetectable. Thus, the notified person moves to a brighter place, thereby enabling the eye detection.

The eye detecting process in the embodiment 4 may be combined with the eye detecting process in the embodiment 2. In this combination, the processings following the processing in the step S14 in FIG. 7 may be executed after the processings in the steps S51 to S56 in FIG. 16 are executed.

The eye detecting process in the embodiment 4 may be combined with the eye detecting process in the embodiment 3. In this combination, the processings following the processing in the step S33 in FIG. 12 may be executed, after the processings in the steps S51 to S54 in FIG. 16 are executed and in the case of YES in the step S54.

Further, the eye detecting process in the embodiment 4 may be combined with the eye detecting processes in the embodiments 2 and 3. In this combination, the processings following the processing in the step S14 in FIG. 7 may be executed after: the processings in the steps S51 to S54 in FIG. 16 are executed; and the processings in the steps S33 to S39 in FIG. 12 are executed in the case of YES in the step S54.

In the embodiments described above, each constituent is constituted by dedicated hardware, or may do performance by executing a software program appropriate for each constituent. Each constituent may do performance by the reading and execution by a program executing part such as a CPU or a processor of a software program stored in a storage medium such as a hard disk or a semiconductor memory. The program may be executed by another independent computer system by transmitting the storage medium storing the program or transmitting the program via a network.

A part or all of the functions of the device according to the embodiments of the present disclosure are carried out using a Large Scale Integration (LSI) that is typically an integrated circuit. The respective functions may be individually performed by single chips. Alternatively, a part or all of the functions may be performed by a single chip. Additionally, circuit integration is not limited to an LSI and may be realized using a dedicated circuit or a general-purpose processor. A Field Programmable Gate Array (FPGA) that can be programmed after LSI production or a reconfigurable processor that allows connection or reconfiguration of circuit cells inside an LSI after LSI production may be used.

A part or all of the functions of the device according to the embodiments of the present disclosure may be carried out by execution of a program by a processor such as a CPU.

All of the numbers mentioned above are merely examples for describing the present disclosure specifically, which the present disclosure is not limited to.

The order in which each of the steps is executed, shown in the above-mentioned flowchart, is merely an example for describing the present disclosure specifically, and may be varied as long as the similar effects can be exerted. Some of the above-mentioned steps may be executed simultaneously (in parallel) with another step.

INDUSTRIAL APPLICABILITY

The technique according to the present disclosure enables improvement of accuracy in detection of an eye of a person from a color image and thus is useful for a technique of detecting an eye of a person from an image.

The invention claimed is:

1. An eye detecting method comprising:
acquiring, by a processor, a color image including a face of a person taken by an image taking device;
generating, by the processor, a grayscale image by multiplying each of a red component value, a green component value, and a blue component value of each pixel of the color image by a predetermined ratio according to characteristics of a lens of glasses that the person wears;
detecting, by the processor, an eye of the person from the grayscale image;
generating, by the processor, a binary image from the color image;
extracting, by the processor, from the binary image an estimated glasses region where the glasses are estimated to be present;
determining, by the processor, whether the person is wearing the glasses, based on a length in a horizontal direction of a white region where a plurality of white pixels continue in the estimated glasses region;
detecting, by the processor, the eye of the person from the color image upon determining that the person is not wearing the glasses; and
outputting, by the processor, eye information on the eye of the person,
wherein the grayscale image is generated by the processor upon determining that the person is wearing the glasses.

2. The eye detecting method according to claim 1, wherein
the predetermined ratio by which the red component value is multiplied is higher than the predetermined ratio by which the green component value is multiplied and the predetermined ratio by which the blue component value is multiplied.

3. The eye detecting method according to claim 2, wherein
the predetermined ratio by which the blue component value is multiplied is zero.

4. The eye detecting method according to claim 1, further comprising:
calculating, by the processor, an average luminance value of an eye region including the eye of the person;
determining, by the processor, whether the average luminance value is higher than a threshold; and
outputting, by the processor, reflection information indicating that the lens of the glasses reflects external light or a background, upon determining that the average luminance value is higher than the threshold.

5. The eye detecting method according to claim 1, further comprising:
detecting, by the processor, a face region including the face of the person from the color image;
calculating, by the processor, an average luminance value of the face region;
determining, by the processor, that the eye of the person is detectable, when the average luminance value is higher than a threshold; and
determining, by the processor, that the eye of the person is undetectable, when the average luminance value is not higher than the threshold.

6. The eye detecting method according to claim 5, further comprising:
notifying the person, by the processor, that the eye of the person is undetectable, upon determining that the eye of the person is undetectable.

7. The eye detecting method according to claim 1, further comprising:
generating, by the processor, a first image in which a pixel having a gradation value smaller than a threshold is represented at a first luminance value and a pixel having a gradation value not smaller than the threshold is represented at a second luminance value, after the grayscale image is binarized;
generating, by the processor, a second image by replacing a pixel which has the second luminance value in a first luminance region having the first luminance value in the first image and satisfies a predetermined condition with a pixel having the first luminance value;
calculating, by the processor, iris information including information indicative of at least one of a position of an iris of the person or a size of the iris of the person using the second image; and
outputting, by the processor, the iris information.

8. An eye detecting device comprising:
a processor; and
a non-transitory computer-readable medium having stored thereon executable instructions that, when executed by the processor, cause the eye detecting device to function as:
an acquiring part for acquiring a color image including a face of a person taken by an image taking device;
a generating part for generating a grayscale image by multiplying each of a red component value, a green component value, and a blue component value of each pixel of the color image by a predetermined ratio according to characteristics of a lens of glasses that the person wears;
a detecting part for detecting an eye of the person from the grayscale image;
wherein the generating part is also for generating a binary image from the color image;
a determining part for extracting from the binary image an estimated glasses region where the glasses are estimated to be present;
wherein the determining part is also for determining whether the person is wearing the glasses, based on a length in a horizontal direction of a white region where a plurality of white pixels continue in the estimated glasses region;
wherein the detecting part is also for detecting the eye of the person from the color image upon determining that the person is not wearing the glasses; and
an outputting part for outputting eye information on the eye of the person,
wherein the eye detecting device is configured to generate the grayscale image upon determining that the person is wearing the glasses.

9. A non-transitory computer-readable medium having stored thereon executable instructions that, when executed by a processor of an eye detecting device, cause the eye detecting device to:
acquire a color image including a face of a person taken by an image taking device;
generate a grayscale image by multiplying each of a red component value, a green component value, and a blue component value of each pixel of the color image by a predetermined ratio according to characteristics of a lens of glasses that the person wears;
detect an eye of the person from the grayscale image;
generate a binary image from the color image;
extract from the binary image an estimated glasses region where the glasses are estimated to be present;
determine whether the person is wearing the glasses, based on a length in a horizontal direction of a white region where a plurality of white pixels continue in the estimated glasses region;
detect the eye of the person from the color image upon determining that the person is not wearing the glasses; and
output eye information on the eye of the person,
wherein the grayscale image is generated by the eye detecting device upon determining that the person is wearing the glasses.

\* \* \* \* \*